US006724528B2

United States Patent
Koplow et al.

(10) Patent No.: US 6,724,528 B2
(45) Date of Patent: Apr. 20, 2004

(54) POLARIZATION-MAINTAINING OPTICAL FIBER AMPLIFIER EMPLOYING EXTERNALLY APPLIED STRESS-INDUCED BIREFRINGENCE

(75) Inventors: Jeff Koplow, Washington, DC (US); Dahv Kliner, San Ramon, CA (US); Lew Goldberg, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 34 days.

(21) Appl. No.: 10/083,358

(22) Filed: Feb. 27, 2002

(65) Prior Publication Data

US 2002/0159139 A1 Oct. 31, 2002

Related U.S. Application Data

(60) Provisional application No. 60/271,413, filed on Feb. 27, 2001.

(51) Int. Cl.[7] .................................................. H01S 3/00
(52) U.S. Cl. .................................................. 359/341.1
(58) Field of Search ........................................ 359/341.1

(56) References Cited

U.S. PATENT DOCUMENTS

| 4,515,436 A | 5/1985 | Howard et al. ........... 350/96.33 |
| 5,005,175 A | 4/1991 | Desurvire et al. ............. 372/6 |

(List continued on next page.)

FOREIGN PATENT DOCUMENTS

EP        0 422 553 A1   8/1991   ............. G02F/1/39

OTHER PUBLICATIONS

Kliner et al. Polarization–maintaining amplifier employing double–clad bow–tie fiber. Optics Letters. vol. 26, No. 4. Feb. 15, 2001. pp. 184–186.*

(List continued on next page.)

Primary Examiner—Thomas G. Black
Assistant Examiner—Deandra M. Hughes
(74) Attorney, Agent, or Firm—John J. Karasek; Stephen T. Hunnius (57) ABSTRACT

A method of forming a linear polarization-maintaining optical fiber for use in an amplifier, the method comprising the steps of:

providing a rare-earth-doped non-polarization-maintaining optical fiber having one or more cladding layers and having a random birefringence;

providing a mandrel having a selected diameter;

coiling said non-polarization-maintaining optical fiber under a selected tension around said mandrel to induce a linear birefringence greater than said random birefringence in said non-polarization-maintaining optical fiber thereby forming a polarization-maintaining optical fiber;

wherein said mandrel diameter is chosen to avoid significant bend loss;

wherein said rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$;

wherein said mandrel diameter is selected to be from about 0.1 cm to about 10 cm; and wherein said tension is chosen to avoid undesirable weakening of said non-polarization-maintaining fiber.

26 Claims, 6 Drawing Sheets

U.S. PATENT DOCUMENTS

| | | | |
|---|---|---|---|
| 5,027,079 A | 6/1991 | Desurvire et al. | 330/4.3 |
| 5,056,888 A | 10/1991 | Messerly et al. | 385/123 |
| 5,136,420 A | 8/1992 | Inagaki et al. | 359/341 |
| 5,155,621 A | 10/1992 | Takeda et al. | 359/337 |
| 5,218,608 A | 6/1993 | Aoki | 372/6 |
| 5,467,218 A | 11/1995 | Takeda et al. | 359/341 |
| 5,532,870 A | 7/1996 | Shigematsu et al. | 359/341 |
| 5,778,129 A | 7/1998 | Shukunami et al. | 385/127 |
| 5,822,487 A * | 10/1998 | Evans et al. | 385/123 |
| 5,883,736 A | 3/1999 | Oshima et al. | 359/341 |
| 5,890,816 A | 4/1999 | Delavaux | 385/11 |
| 5,949,941 A | 9/1999 | DiGiovanni | 385/127 |
| 6,008,932 A | 12/1999 | Luo et al. | 359/337 |
| 6,049,415 A | 4/2000 | Grubb et al. | 359/341 |
| 6,072,811 A | 6/2000 | Fermann et al. | 372/11 |
| 6,081,369 A | 6/2000 | Waarts et al. | 359/341 |
| 6,151,429 A | 11/2000 | Kristensen et al. | 385/11 |
| 6,496,301 B1 * | 12/2002 | Koplow et al. | 359/337 |
| 2003/0086668 A1 * | 5/2003 | Kliner et al. | 385/123 |

OTHER PUBLICATIONS

Ulrich et al, Fiber–ring interferometer: polarization analysis, Optics Letters, Vol 4, No. 5, May 1979, pp. 152–154.

http://www.fibercore.com/dhb1500.php. Polarization Maintaining Optical Fiber Product Specification.*

Chbat, Michel W. Managing Polarization Mode Dispersion. Photonics Spectra. pp. 100–104. Jun. 2000.*

Koplow et al., Polarization–maintaining, double–clad fiber amplifier employing externally applied stress–induced birefringence, Optics Letters, vol. 25, No. 6, Mar. 15, 2000, pp. 387–389.

Goldberg et al, V–groove side–pumped 1.5um fibre amplifier, Electronic Letters, vol. 33, No. 25, Dec. 4, 1997, pp. 2127–2129.

Cooper et al, Widely tunable polarization–stable fiber lasers, Quantum Electronics, vol. 1, No. 1, Apr. 1995, pp. 14–21.

Duling III et al, Single–polarization fibre amplifier, Electronics Letters, vol. 28, No. 12, Jun. 4, 1992, pp. 1126–1128.

Rashleigh, Origins and control of polarization effects in single–mode fibers, Journal of Lightwave Technology, vol. LT1, No. 2, Jun. 1983, pp. 312–331.

Rashleigh et al, Polarization holding in birefringent single–mode fibers, Optics Letters, Vol 7, No. 1,, Jan. 1982, pp. 40–42.

Rashleigh et al, High birefringence in tension–coiled single–mode fibers, Optics Letters, vol. 5, No. 8, Aug. 1980, pp. 354–356.

Ulrich et al, Bending–induced birefringence in single–mode fibers, Optics Letters, vol. 5, No. 6, Jun. 1980, pp. 273–275.

* cited by examiner

POLARIZATION-MAINTAINING OPTICAL FIBER AMPLIFIER EMPLOYING EXTERNALLY APPLIED STRESS-INDUCED BIREFRINGENCE

CROSS REFERENCE TO OTHER RELATED APPLICATIONS

This application claims priority from U.S. Provisional Application No. 60/271,413 filed on Feb. 27, 2001.

FIELD OF THE INVENTION

The invention relates in general to a polarization-maintaining optical fiber amplifier that is fabricated from non-polarization-maintaining gain optical fiber. More specifically, the invention employs coiling under tension to create a stress-induced axis of linear birefringence within the fiber.

BACKGROUND OF THE INVENTION

A wide variety of applications in fiber optic photonics require the use of polarization-maintaining optical fibers. In such a fiber the polarization planes of linearly polarized light waves launched into the optical fiber are maintained during propagation with little or no cross coupling of optical power between the orthogonal polarization modes. In many of these systems there is also a need for polarization-maintaining optical fiber amplifiers. An optical fiber amplifier is a device that amplifies an optical signal directly, i.e., without the need to convert it to an electrical signal, amplify it electrically, and reconvert it to an optical signal.

An optical fiber amplifier uses an optical fiber having a rare-earth-doped core, which will be referred to hereinafter as a gain optical fiber. Although $Er^{3+}$ is most commonly used as a rare-earth element in gain optical fibers, different rare earth elements such as $Nd^{3+}$, $Yb^{3+}$, $Pr^{3+}$, $Ho^{3+}$, $Sm^{3+}$, and $Tm^{3+}$ may be used. The rare-earth ion is optically excited, typically but not exclusively using the output of a diode laser; a signal beam propagating in the core experiences gain if a population inversion has been established by absorption of the pump beam by the rare-earth ions (and if the signal beam has a wavelength within the gain spectrum of the rare-earth dopant).

Optical fiber amplifiers generally out-perform conventional solid-state amplifiers in the following key areas: small-signal gain, tunability, beam quality (for single-mode optical fibers), immunity to mechanical and thermal disturbances, size, weight, cost, and electrical efficiency. One notable disadvantage of optical fiber amplifiers is their tendency to scramble the input polarization of the seed signal. This polarization-scrambling effect is a consequence of azimuthal asymmetry in the refractive-index distribution of the optical fiber, commonly referred to as optical fiber birefringence. A linearly polarized seed signal injected into the fiber will generally be converted to an unspecified, time-dependent elliptical polarization state, i.e., the fiber is not polarization maintaining.

In an ideal optical fiber having an azimuthally symmetric refractive-index profile, a signal injected into one end of the fiber will propagate through the optical fiber with its polarization state unchanged. Each of the transverse modes supported by the optical fiber waveguide can exist in two orthogonal polarizations (e.g., vertical and horizontal), and in a perfectly symmetric optical fiber these two polarization modes propagate at the same speed, independent of one another (i.e., the fiber is not birefringent). In practice, it is impossible to manufacture an optical fiber that has perfect azimuthal symmetry, and all real optical fibers thus exhibit non-zero birefringence. Core or cladding ellipticity and mechanical strain, which causes random refractive-index perturbations, are the main contributors to random birefringence in an optical fiber and thus to non-polarization-maintaining behavior.

There are several solutions for the problem of polarization scrambling due to random birefringence in an optical fiber. As described below, random birefringence may be corrected by utilizing a polarization controller, a Faraday mirror, or a polarization-maintaining optical fiber.

The simplest solution to the problem of polarization scrambling due to optical fiber birefringence is the use of a polarization controller. There are a number of different designs for polarization controllers, but in all cases the principle of operation is the same. The birefringent optical fiber is sandwiched between two waveplates whose orientation and retardation are independently adjustable; alternatively the fiber input or output beam may be directed through three waveplates whose orientations but not retardations are adjustable. It can be shown that for any fiber birefringence, it is always possible to set the adjustable waveplates such that there is no change in the polarization state for a signal passing through the entire system (fiber plus polarization controller). Unfortunately, the birefringence properties of the optical fiber are sensitive to environmental factors, such as changes in temperature or mechanical disturbances. Changes in the birefringence properties of the optical fiber over time necessitate readjustment of the polarization controller, making it unsuitable for most real-world applications.

In some optical fiber circuits, a device known as a Faraday mirror can be used to compensate for optical fiber birefringence. In a Faraday mirror, a signal passing through the birefringent optical fiber must retrace it's path through the optical fiber, traveling in the opposite direction on the return trip, thereby creating a folded optical path. The Faraday mirror never needs adjustment and is able to compensate for rapid changes in birefringence, limited only by the round-trip propagation in the fiber. The main disadvantage of the Faraday mirror is that it is applicable to only a small subset of optical fiber circuits and is therefore lacking in generality. In addition, commercially available Faraday mirrors suffer from one or more the following drawbacks: high cost, large size and weight, limited power-handling capability, and limited wavelength range (i.e., a wavelength range smaller than the range over which the fiber exhibits gain).

The best all-around solution to the problem of optical fiber birefringence is the use of a polarization-maintaining (PM) optical fiber. In a PM optical fiber, a very large azimuthal asymmetry is introduced intentionally during the manufacturing process. The goal is to create a controlled linear birefringence that is very large (compared with the random birefringence) and oriented along a well-defined axis. This birefringence can be generated by fabricating an optical fiber core with an elliptical cross-section, by subjecting an optical fiber to mechanical stress, or by a combination of both techniques. When this linear birefringence is much greater than the random birefringence due to optical fiber imperfections, good PM behavior is obtained.

FIGS. 1–4 show cross-sections of various conventional PM optical fibers 10, looking down the optical fiber axes. The components of the PM optical fibers may include a core 20, a cladding 22, and stress elements 24.

Figure 1:
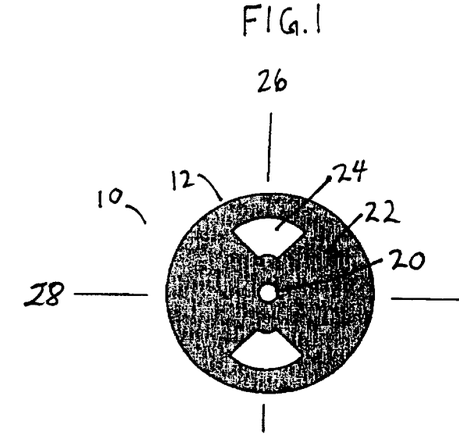
FIG. 1 illustrates a cross section of PM optical fiber with bow-tie stress elements.
Figure 2:
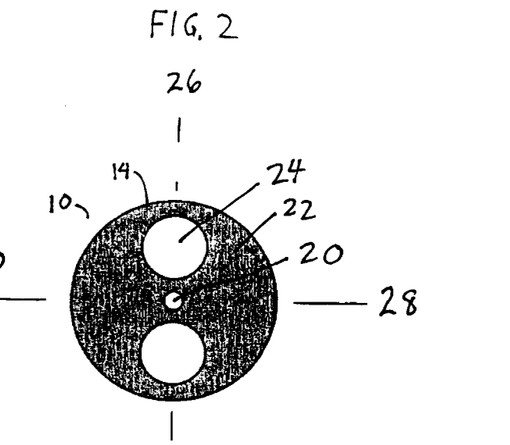
FIG. 2 illustrates a cross section of PM optical fiber with round stress elements (a Panda fiber)
Figure 3:
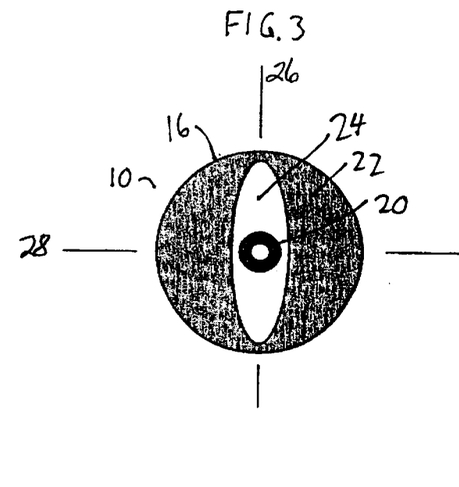
FIG. 3 illustrates a cross section of PM optical fiber with an oval-inner-cladding stress element.
Figure 4:
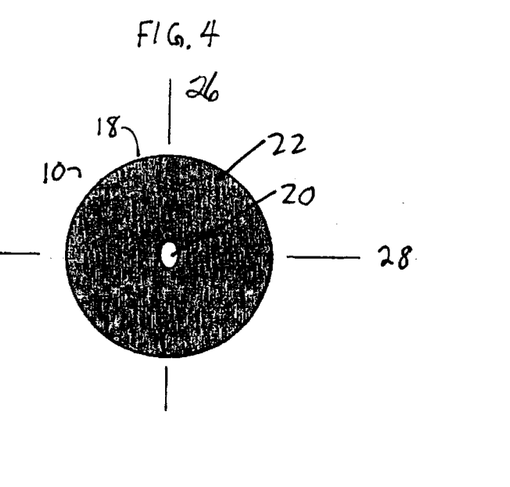
FIG. 4 illustrates a cross section of PM optical fiber with an oval core.

The stress elements 24 shown in FIGS. 1–3 for the bow-tie 12, Panda 14, and oval-inner-clad 16 PM optical fibers are fabricated from a glass whose thermal expansion coefficient is different (usually greater) than that of the cladding 22 glass, which is usually silica. During manufacture, the optical fiber 10 is drawn from molten glass and therefore starts out stress-free. Solidification occurs several hundred degrees above room temperature, at which point the optical fiber 10 is capable of accumulating mechanical stress. As the optical fiber 10 cools further, the stress elements 24 contract differently (usually more) than the surrounding cladding, generating a stress field that is azimuthally asymmetric. Specifically, the stress distribution has two-fold bilateral symmetry, in which the mirror planes of minimum and maximum stress are perpendicular to each other. The stress-induced change in the refractive index has these same symmetry properties. Within each PM optical fiber 10 there is thus a fast axis 26 and a slow axis 28 that are mutually perpendicular (analogous to a waveplate). Because of the difference in index of refraction, a ray of light whose polarization direction is aligned along the fast axis propagates at a slightly faster speed than a ray of light whose polarization direction is aligned along the slow axis.

If linearly polarized light is injected into a PM optical fiber with its polarization direction aligned parallel to either the fast or slow axis of linear birefringence, no polarization scrambling is observed. There are three factors that determine how well such an optical fiber will preserve polarization in practice: the amount of stress-induced linear birefringence, the amount of random birefringence due to fiber imperfections, and the length of fiber. As mentioned earlier, good PM behavior is obtained if the induced linear birefringence is made much greater than the random birefringence due to optical fiber imperfections. In a well-designed PM fiber, random birefringence is thus kept to a minimum while the linear birefringence is made as large possible. A typical value for commercially available PM optical fiber is $\Delta n = 2 \times 10^{-4}$, where $\Delta n$ is the difference between the refractive indices of the fast and slow axes.

There has been very little progress in the area of optical fiber amplifiers based on PM rare-earth-doped gain optical fiber. The existing methods for gain optical fiber fabrication include modified chemical vapor deposition and solution doping, and these methods are generally incapable of producing optical fiber preforms with anything other than an azimuthally symmetric distribution of constituents. The incorporation of stress rods, for example, is not straightforward. At present there is only one rare-earth-doped PM gain optical fiber that is commercially available, an Er-doped gain optical fiber manufactured by Fibercore Ltd. (UK).

The Fibercore Er-doped gain optical fiber is not appropriate for the construction of high-power optical fiber amplifiers because it is single-clad and can thus be efficiently pumped only with single-mode pump sources. Single-mode pump sources for single-clad gain optical fiber are costly and provide relatively low pump powers (about $3000 for a 0.1 W pump source). It is therefore preferable to use a cladding-pumped amplifier with a double-clad gain optical fiber. The advantage of using double-clad gain optical fiber is that low-brightness, broad-area (multimode), laser diode pump sources can be efficiently coupled into the inner cladding. These multimode sources offer much higher power at much lower cost (less than $300 per Watt of pump power) than single-mode pump sources. In addition, the optics used to couple pump light into the double-clad gain optical fiber is much less sensitive to misalignment by mechanical disturbances or fluctuations in ambient temperature. This combination of properties makes double-clad gain optical fibers well suited to a wide variety of optical fiber amplifier applications. Unfortunately, PM gain optical fibers incorporating rare-earth dopants other than $Er^{3+}$ and double-clad PM gain optical fibers are not commercially available. A PM, Yb-doped, double-clad optical fiber was recently demonstrated, but this fiber is not yet available commercially.

It would therefore be desirable to provide a PM optical fiber amplifier that uses non-polarization-maintaining gain optical fiber, which is widely available.

SUMMARY OF THE INVENTION

These and other objects of the invention are achieved in a preferred method of the invention.

An aspect of the present invention is a method of forming a linear polarization-maintaining optical fiber for use in an amplifier, the method comprising the steps of: providing a rare-earth-doped non-polarization-maintaining optical fiber having one or more cladding layers and having a random birefringence; providing a mandrel having a selected diameter; coiling the non-polarization-maintaining optical fiber under a selected tension around the mandrel to induce a linear birefringence greater than the random birefringence in the non-polarization-maintaining optical fiber thereby forming a polarization-maintaining optical fiber; wherein the mandrel diameter is chosen to avoid significant bend loss; wherein the rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$; wherein the mandrel diameter is selected to be from about 0.1 cm to about 10 cm; and wherein the tension is chosen to avoid undesirable weakening of the non-polarization-maintaining fiber.

Another aspect of the present invention is an optical amplifier with a rare-earth-doped polarization-maintaining optical fiber, the amplifier comprising: a mandrel having a selected diameter; a rare-earth-doped polarization-maintaining optical fiber having one or more cladding layers and having linear birefringence greater than a random birefringence; and a pump source which is coupled to the optical fiber; wherein the rare-earth-doped polarization-maintaining optical fiber is coiled around the mandrel under tension; wherein the mandrel diameter is chosen to avoid significant bend loss; wherein the rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$; wherein the mandrel diameter is selected to be from about 0.1 cm to about 10 cm; and wherein the tension is chosen to avoid undesirable weakening of the polarization-maintaining fiber.

A further aspect of the present is a method of forming a linear polarization-maintaining optical fiber amplifier, the method comprising the steps of: providing a rare-earth-doped non-polarization-maintaining optical fiber having one or more cladding layers and having a random birefringence; providing a mandrel having a selected diameter; coiling the non-polarization-maintaining optical fiber under a selected tension around the mandrel to induce a linear birefringence greater than the random birefringence in the non-polarization-maintaining optical fiber thereby forming a polarization-maintaining optical fiber; and coupling a pump source to polarization-maintaining optical fiber; wherein the mandrel diameter is chosen to avoid significant bend loss; wherein the rare-earth dopant is selected from the group consisting $Nd^{3+}$, $Yb^{3+}$, $Pr^{3+}$, $Er^{3+}$, $Sm^{3+}$, $Ho^{3+}$ and $Tm^{3+}$; wherein the mandrel diameter is selected to be from about 0.1 cm to about 10 cm; and wherein the tension is chosen to avoid undesirable weakening of the non-polarization maintaining fiber.

A further aspect of the present invention is an optical amplifier with a rare-earth-doped polarization-maintaining optical fiber, the amplifier comprising: a mandrel having a selected diameter; a rare-earth-doped polarization-maintaining optical fiber having one or more cladding layers and having linear birefringence greater than a random birefringence; and a pump signal source which is coupled to the optical fiber; wherein the rare-earth-doped polarization-maintaining optical fiber is coiled around the mandrel; wherein the mandrel diameter is chosen to avoid significant bend loss; wherein the rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$; wherein the mandrel diameter is selected to be from about 0.1 cm to about 10 cm; and wherein the diameter of said polarization-maintaining optical fiber is from about 50 $\mu$m to about 1000 $\mu$m.

Another aspect of the present invention is a method of forming a linear polarization-maintaining optical fiber for use in an amplifier, the method comprising the steps of: providing a rare-earth-doped non-polarization-maintaining optical fiber having one or more cladding layers, a diameter and a random birefringence; providing a mandrel having a selected diameter; coiling the non-polarization-maintaining optical fiber around the mandrel to induce a linear birefringence greater than the random birefringence in the non-polarization-maintaining optical fiber thereby forming a polarization-maintaining optical fiber; wherein the mandrel diameter is chosen to avoid significant bend loss; wherein the rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$; wherein the mandrel diameter is selected to be from about 0.1 cm to about 10 cm; and wherein the diameter of the non-polarization-maintaining optical fiber is from about 50 $\mu$m to about 1000 $\mu$m.

A further aspect of the present invention is a method of forming a linear polarization-maintaining optical amplifier for use in an amplifier, the method comprising the steps of: providing a rare-earth-doped non-polarization-maintaining optical fiber having one or more cladding layers, a diameter and a random birefringence; providing a mandrel having a selected diameter; coiling the non-polarization-maintaining optical fiber under a selected tension around the mandrel to induce a linear birefringence greater than the random birefringence in the non-polarization-maintaining optical fiber thereby forming a polarization-maintaining optical fiber; coupling a pump source to polarization-maintaining optical fiber; wherein the mandrel diameter is chosen to avoid significant bend loss; wherein the rare-earth dopant is selected from the group consisting $Nd^{3+}$, $Yb^{3+}$, $Pr^{3+}$, $Er^{3+}$, $Sm^{3+}$, $Ho^{3+}$ and $Tm^{3+}$; wherein the mandrel diameter is selected to be from about 0.1 cm to about 10 cm; and wherein the non-polarization-maintaining optical fiber diameter is from about 50 $\mu$m to about 1000 $\mu$m.

BRIEF DESCRIPTION OF THE DRAWINGS

These and other objects, features and advantages of the invention, as well as the invention itself, will become better understood by reference to the following detailed description when considered in connection with the accompanying drawings wherein like reference numbers designated identical or corresponding parts throughout the several views, and wherein.

DETAILED DESCRIPTION OF THE PREFERRED EMBODIMENTS

Figure 5:
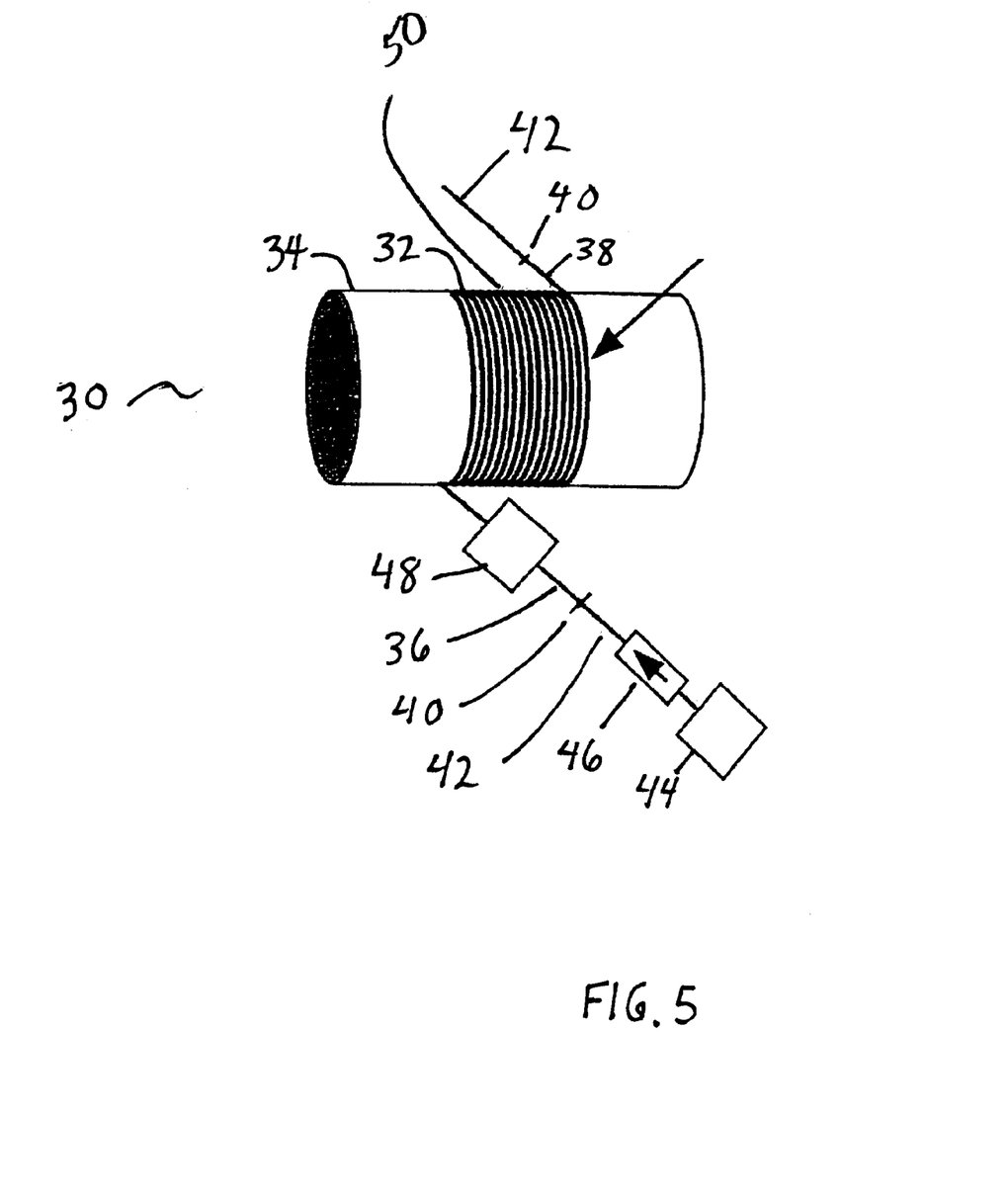
FIG. 5 illustrates a PM optical fiber amplifier in accordance with the present invention.

FIG. 5 illustrates a polarization-maintaining (PM) optical fiber amplifier 30 in accordance with a preferred embodiment of the invention. The PM optical fiber amplifier 30 is constructed with a non-polarization-maintaining gain optical fiber 32 that is preferably coiled under tension around a spool 34 and thereby becomes PM optical fiber 50. The spool 34 is any solid or hollow cylindrical object that is composed of a suitable material and that may be used to support the tension-coiled gain optical fiber 32. The PM gain optical fiber 50 has an input end 36 and an output end 38, which are spliced 40 to PM non-gain (passive) optical fiber pigtails 42. To splice PM optical fibers 50 to 42, it is important that the axes of birefringence for the two optical fibers be aligned to within plus or minus a few degrees. For this reason, a gain optical fiber with a square or rectangular cross section is ideal for fabrication of PM amplifiers based on stress-induced birefringence, because the axes of birefringence are constrained to run parallel to the edges of the square or rectangle and are therefore easily identified on an optical fiber splicing machine. However, other commercially available optical fiber cross-sections may also be used, including round, hexagonal, etc.

The seed signal that is to be amplified is introduced into the amplifier with a seed signal source 44, which is optically directed through an optical isolator and a polarizer 46 to generate a polarized seed signal. The output of an optical pump source 48 is also introduced into the optical fiber.

The non-PM gain optical fiber 32 is coiled under tension around the spool 34, resulting in stress-induced linear birefringence. The spool diameter, $d_{spool}$, and tension induced axial strain, $\epsilon$, are chosen to provide sufficient birefringence for PM operation without introducing significant bend loss. Bend loss occurs in an optical fiber when the optical fiber is curved to a diameter that is so small that light is no longer well guided within the fiber core.

Equations for the stress-induced birefringence of a tension-coiled single-mode optical fiber are presented in an article by S. C. Rashleigh and R. Ulrich, High birefringence in tension-coiled single-mode fibres, Opt. Lett., Vol. 5, No. 8, pg. 354 (1980). Stress-induced birefringence for a tension-coiled optical fiber may be much larger than that resulting when the optical fiber is bent without tension, and the resulting birefringence is given by:

$$\beta_{tc,slab} = \frac{\pi n^3 \varepsilon d_{fiber}}{\lambda d_{spool}}(p_{11} - p_{12})(1+v)$$

for a slab geometry, while the corresponding expression for a fiber of circular cross section is given by:

$$\beta_{tc,circ} = \frac{\pi n^3 \varepsilon d_{fiber}}{\lambda d_{spool}}(p_{11} - p_{12})(1+v)\left(\frac{2-3v}{1-v}\right).$$

In these equations, n is the refractive index for fused silica (dimensionless), $p_{11}$ and $p_{12}$ represents strain-optic tensor components for fused silica (dimensionless), $v$ is Poisson's ratio for fused silica (dimensionless), $d_{fiber}$ is the diameter of the optical fiber 32 in the plane of curvature of the optical fiber coil (m), $d_{spool}$ is the diameter of the spool 34 around which the optical fiber is coiled (m), $\varepsilon$ is the axial strain applied to the optical fiber (dimensionless), and $\lambda$ is the free-space wavelength of a signal propagating in the gain optical fiber (m). The birefringence ($\beta_{tc}$) has units of radians/m.

The equation for $\beta_{tc,\,circ}$, the birefringence induced by coiling under tension, may be compared with the birefringence induced by bending an optical fiber having a circular cross section without any tension, $\beta_{bend,\,circ}$, which is also disclosed in the above referenced article by S. C. Rashleigh and R. Ulrich:

$$\beta_{bend,circ} = \frac{\pi n^3 d_{fiber}^2}{2\lambda d_{spool}^2}(p_{11} - p_{12})(1+v).$$

Note that $\beta_{tc,\,circ}$ and $\beta_{bend,\,circ}$ are additive, with the fast axis of linear birefringence of the optical fiber lying in the plane of curvature of the optical fiber core.

Referring back to the above equation for the birefringence of the tension-coiled optical fiber, to maximize the stress-induced birefringence, the diameter of the gain optical fiber 32 and the tension should be made as large as possible, and the diameter of the spool 34 should be made as small as possible.

For a standard single-clad optical fiber $d_{fiber}$=125 μm. For a typical double-clad optical fiber $d_{fiber}$ is usually between 100 μm and 500 μm. In the case of a single-clad optical fiber, the diameter of the silica cladding can be increased arbitrarily without affecting the properties of the waveguide region and is limited only by optical fiber stiffness above ~500 μm. For the double-clad optical fiber the choice of $d_{fiber}$ is somewhat constrained by the need for efficient pump absorption.

Figure 6:
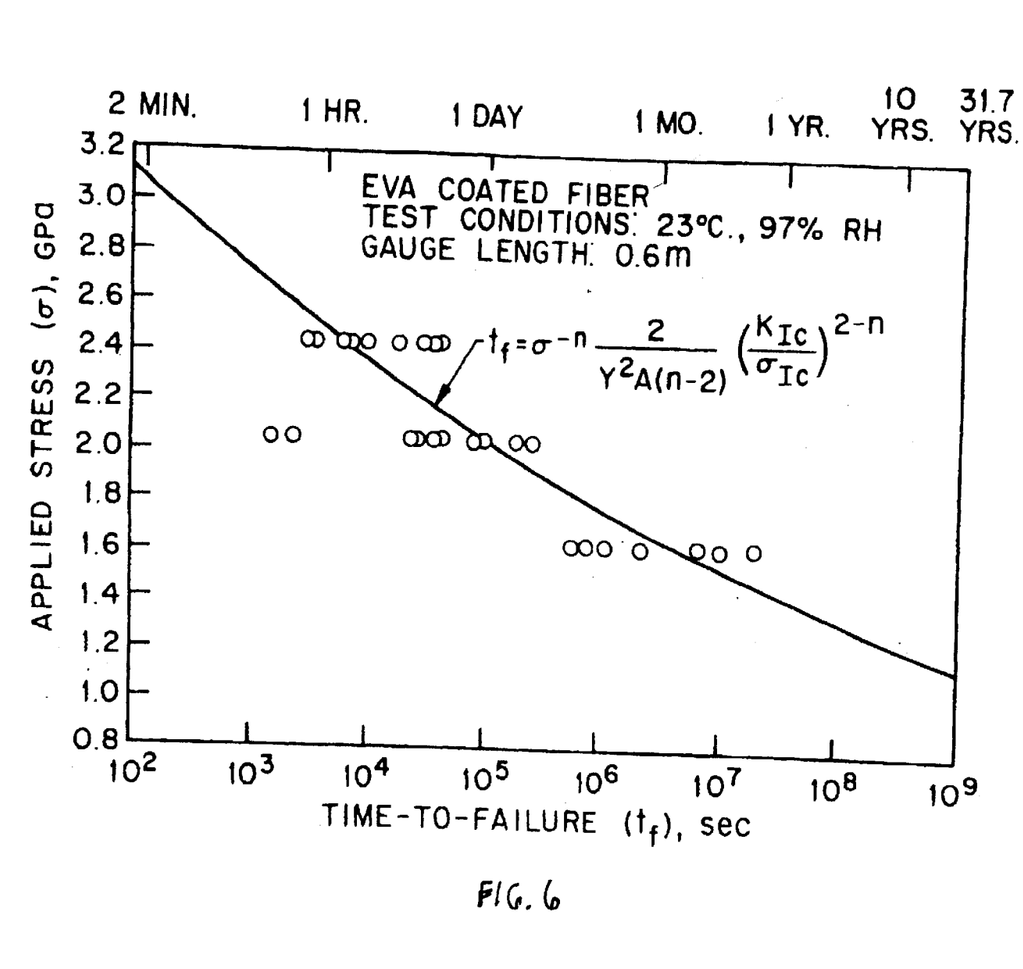
FIG. 6 is a graph of applied tensile stress (GPa) vs. optical fiber time to failure (sec)

The maximum tension induced axial strain, $\varepsilon$, that can be applied to the gain optical fiber 32 requires careful consideration. FIG. 6 is a graph of optical fiber lifetime as a function of tensile stress. As shown in FIG. 6, with increasing tension the mean time to fiber failure decreases dramatically. To be conservative, $\varepsilon$·0.010 (1.0% strain) may be used as an upper limit, corresponding to an applied stress of about 0.72 GPa in FIG. 6. This upper limit may be applied to all types of high-quality optical fiber. Fiber failure can also be caused by bending-induced stress for small spool diameters, but this limitation is not significant relative to the above considerations.

If the spool 34 diameter, $d_{spool}$, is too small the gain optical fiber 32 will no longer function as a waveguide due to bend loss. The numerical aperture (NA) of the optical fiber determines its sensitivity to bend loss, and fibers with high NA are preferable for attaining maximum birefringence. (NA=sin α, where α is the acceptance half-angle of the optical fiber, and an incoming ray of light that lies outside of the acceptance cone of the optical fiber is not guided by the core.)

EXAMPLE

In this example, a PM optical fiber amplifier 30 was constructed in accordance with the invention using 5 m of an Er/Yb-doped double-clad non-PM gain optical fiber 32 (manufactured by Lucent Technologies). The fiber was side-pumped using a laser diode 48. The gain optical fiber 32 had a hexagonal-shaped inner cladding with a diameter of 126 μm, measured from flat surface to flat surface. The NA of the gain optical fiber 32 was 0.16, which is typical for a telecommunications optical fiber, and this permitted a spool 34 diameter of 15 mm to be used.

The gain optical fiber 32 was wound around the spool 34 under 66 kg/m² of tension using a free-hanging weight, which corresponds to $\varepsilon$=0.91% strain along the length of the gain optical fiber 32. Because the cross-section of the gain optical fiber 32 was hexagonal, it laid flat on the spool in one of six identical angular orientations. The hanging weight was free to rotate, so the gain optical fiber 32 wound onto the spool 34 without twisting. After winding, the gain optical fiber 32 was secured with a removable adhesive and spliced on both ends to 1 meter long PM non-gain (passive) optical fiber pigtails 42. The length of non-PM gain optical fiber running from the spool 34 to the PM pigtail 42 was made as short as possible (about 10 cm) to minimize polarization scrambling.

To accomplish splicing 40 between the gain optical fiber 32 and the PM pigtails 42, the hexagonal gain optical fiber 32 was secured in the chuck of an optical fiber splicing machine without introducing any twists, so that the orientation of the axes of linear birefringence could be referenced to that of the spool 34.

A V-groove side pumping technique was used to couple light from a single-stripe laser diode into the inner cladding of the double-clad optical fiber, as disclosed in an article by L. Goldberg et al., V-groove side-pumped 1.5 μm fiber amplifier, Electron. Lett., Vol. 33, No. 25, pg. 2127 (1997); however any alternative pumping scheme may be used. As shown in FIG. 5, the pump signal source 48, including the V-groove and its associated hardware, were located near one of gain optical fiber 40.

The calculated birefringence for this system was $\beta = \beta_{tc,\,slab} + \beta_{bend,\,circ}$=95 rad/m+40 rad/m=135 rad/m. The actual birefringence was measured in the laboratory to be 110 rad/m using the broadband measurement technique described in an article by S. C. Rashleigh et al., Polarization holding in birefringent single-mode fibers, Opt. Lett., Vol. 7, No. 1, pg. 40 (1982). The discrepancy between the calculated and experimental values for β may be attributed to one or more of the following factors. The slab geometry used to calculate $\beta_{tc}$ applies only approximately to the hexagonal gain optical fiber, because each hexagonal face is concave rather than flat. Similarly, the cylindrical geometry used to calculate $\beta_{bend}$ applies only approximately to the hexagonal optical fiber. The distribution of tensile force between the optical fiber and the mandrel is altered somewhat by the presence of the optical fiber jacket. The optical fiber jacket material may be subject to creepage under strain, in which case the initial value for β would be expected to decrease somewhat after winding under tension. In light of these considerations, the agreement between the measured and calculated values of the birefringence is good.

Figure 7:
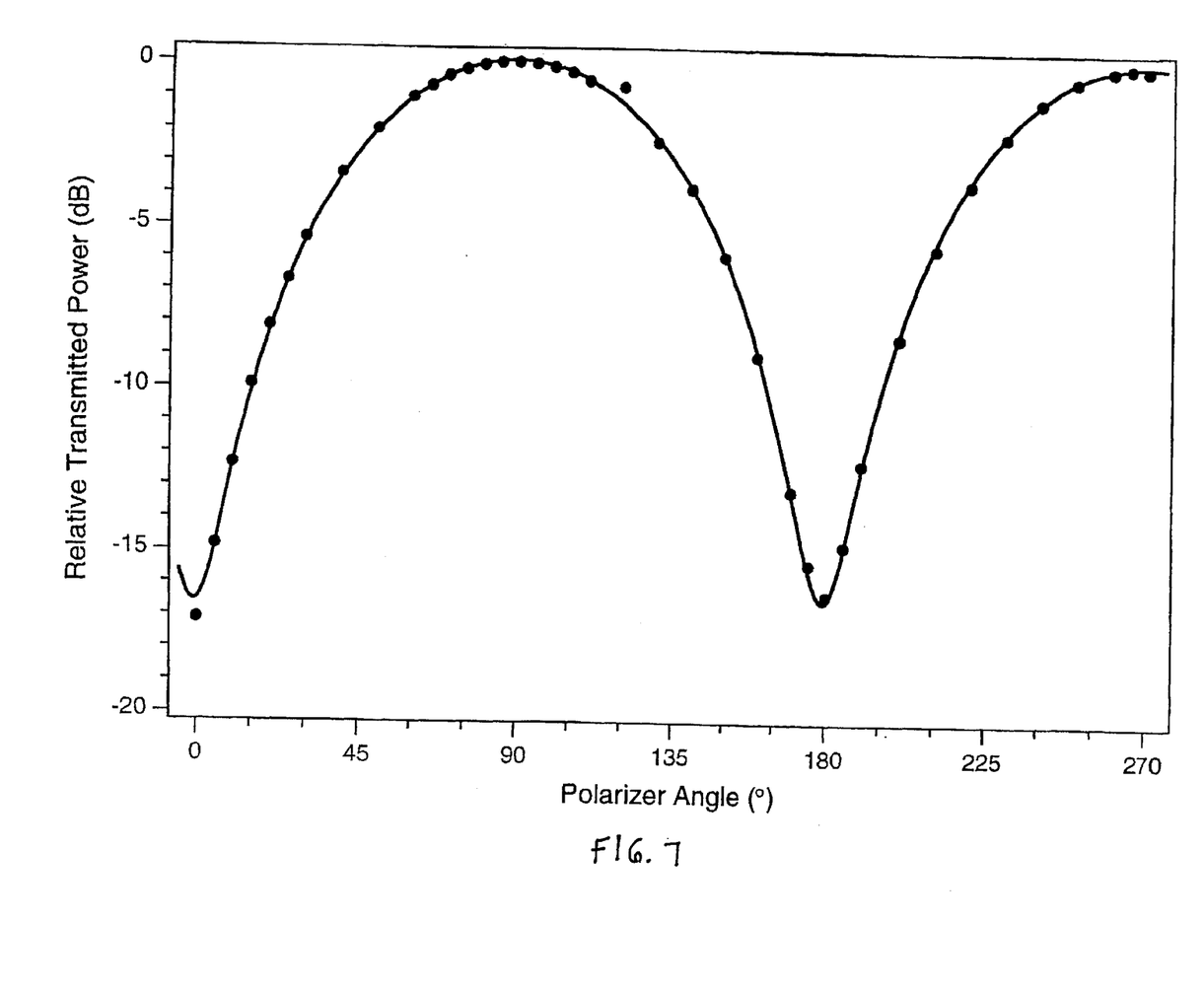
FIG. 7 is a graph of relative transmitted power (dB) vs. polarizer angle (degrees), which demonstrates the polarization extinction ratio measurement for the amplifier.
Figure 8:
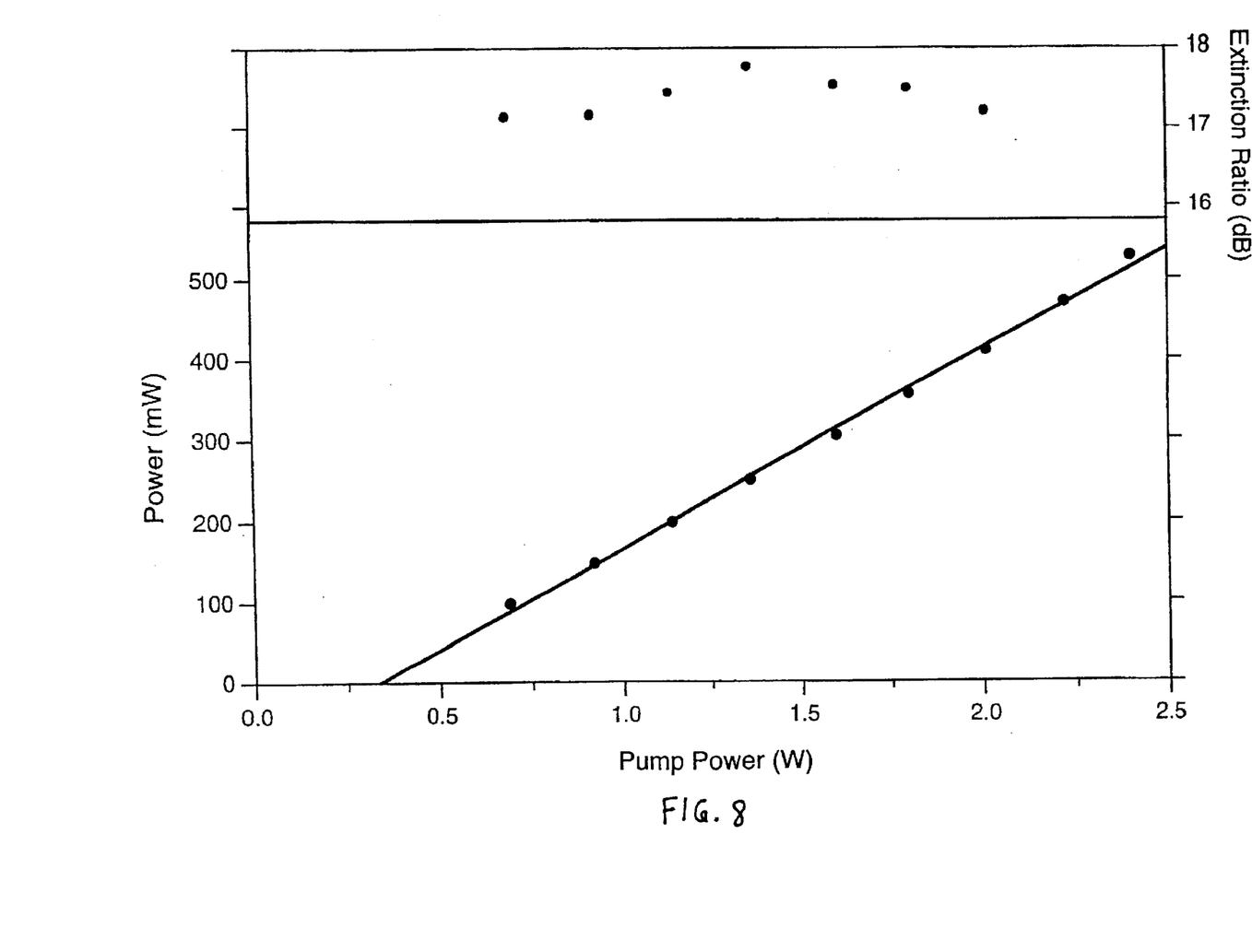
FIG. 8 is a graph of output power (mW) and extinction ratio (dB) vs. pump power (W)
Figure 9:
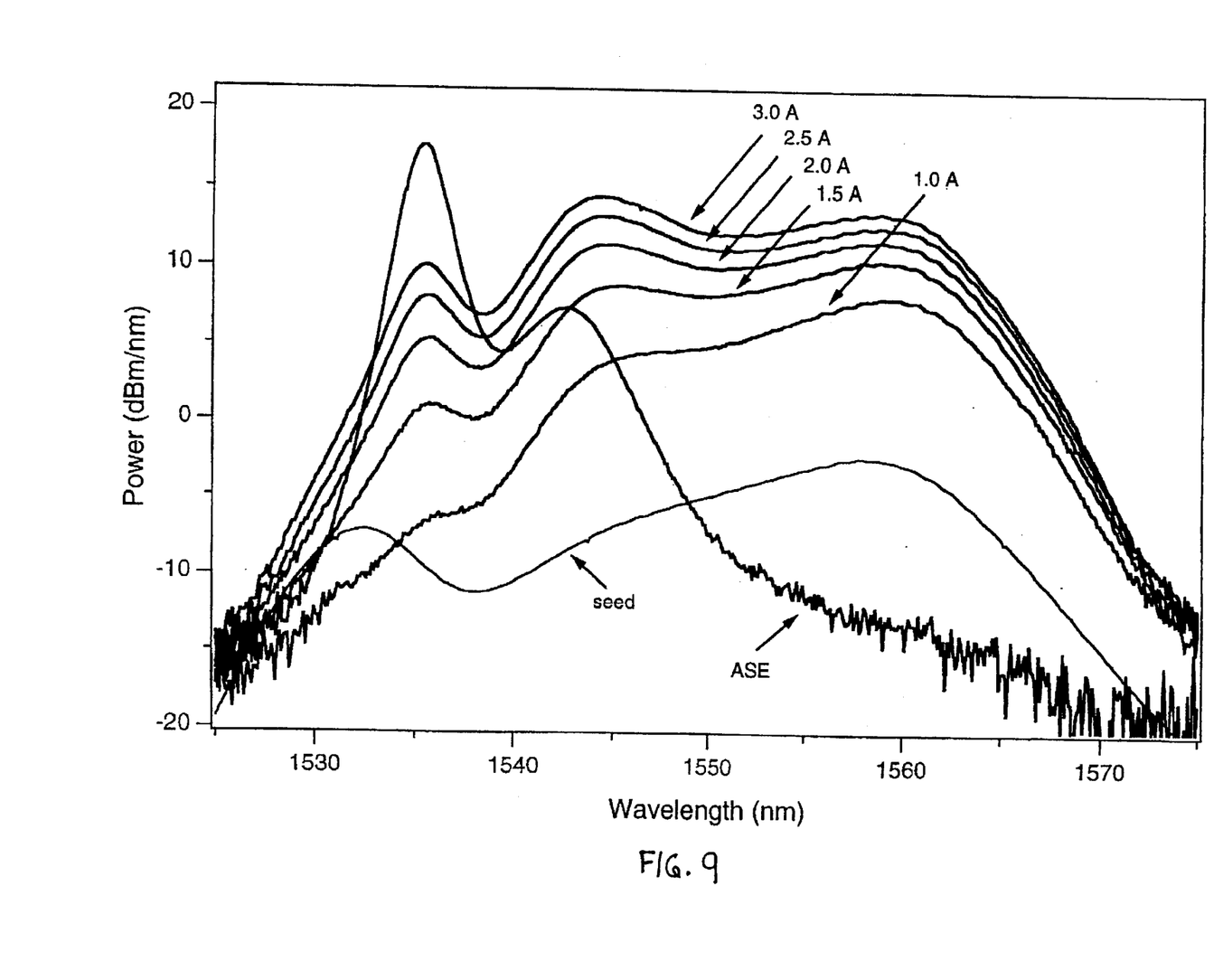
FIG. 9 is a graph of output power (dBm/nm) vs. wavelength (nm).

The optical fiber amplifier was seeded by a linearly polarized amplified spontaneous emission source whose broadband output covered the 1530–1570 nm range. The PM optical fiber amplifier 30 had an output power in excess of 500 mW. FIGS. 7–9 summarize the results obtained with the above PM optical fiber amplifier. FIG. 7 is a graph of relative transmitted power (dB) vs. polarizer angle (θ), which demonstrates the polarization extinction ratio measurement for the amplifier. The data in FIG. 7 were recorded by passing the output of the optical fiber amplifier through a high-extinction-ratio polarizer. The angular orientation (θ) of the polarizer was varied from 0 to 270 degrees, showing the expected $\sin^2\theta$ dependence for transmitted intensity. A polarization extinction ratio of 50:1 (17 dB) was obtained. It is likely that the actual extinction ratio was somewhat greater than indicated by the data in FIG. 7 because, in addition to amplified signal, spontaneous emissions and amplified spontaneous emission were present at the output of the amplifier.

FIG. 8 is a graph of output power (mW) and extinction ratio (dB) vs. pump power (W). FIG. 8 demonstrates that the polarization extinction ratio was independent of pump power. The wavelength distribution of the seed signal and the amplified output are shown in FIG. 9; winding the gain optical fiber 32 under tension in accordance with the present invention did not impair the performance of the amplifier from the standpoint of spectral coverage, gain, efficiency, etc.

In summary, the present invention provides a straightforward and flexible approach to the fabrication of PM optical fiber amplifiers and offers the following important advantages: (1) System complexity is not increased, as no additional components are inserted in the optical path. (2) The optical fiber ends are left unobstructed. (3) PM capability can be added without disturbing the design or performance characteristics of an existing optical fiber amplifier system (because addition of additional optics or reconfiguration of existing optics is not required). (4) The method can be applied to many non-PM gain optical fibers, both single- and double-clad. The exceptions are likely to be optical fibers with very low NA's or optical fibers of poor quality (intrinsically high random birefringence). (5) The technique is achromatic (6) It is compatible with single- or multiple-pass operation of the amplifier. (7) The required capital investment is negligible. The optical fiber winding apparatus is simple to construct and costs approximately $300 (in comparison, the cost of one optical fiber fabrication run is at least $20,000).

The invention has been described with reference to certain preferred embodiments thereof. It will be understood, however, that modification and variations are possible within the scope of the appended claims. For example, this technique may also be implemented using multimode gain optical fibers, which are of interest for applications that require very high average and/or peak powers. In addition, for certain high-NA optical fibers, typically a NA greater than 0.15 and depends on the $d_{fiber}$, it may be possible to achieve adequate birefringence without winding the optical fiber under tension; if the spool diameter is small enough, bending stress alone may introduce sufficient linear birefringence for PM operation (see equation for $\beta_{bend}$).

Therefore, what has been described above is a method, which utilizes a mandrel having a selected diameter and tension or utilizes a mandrel having a selected diameter without tension for optical fiber having a high NA for fabricating a polarization-maintaining optical fiber for use in an amplifier.

It should therefore readily be understood that many modifications and variations of the present invention are possible within the purview of the claimed invention.

What is claimed is:

1. A method of forming a linear polarization-maintaining optical fiber for use in an amplifier, the method comprising the steps of:

providing a rare-earth-doped non-polarization-maintaining optical fiber having one or more cladding layers and having a random birefringence;

providing a mandrel having a selected diameter;

coiling said non-polarization-maintaining optical fiber under a selected tension around said mandrel to induce a linear birefringence greater than said random birefringence in said non-polarization-maintaining optical fiber thereby forming a polarization-maintaining optical fiber; and securing said polarization-maintaining optical fiber to said mandrel to thereby maintain said tension;

wherein said mandrel diameter is chosen to avoid significant bend loss;

wherein said rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$;

wherein said mandrel diameter is selected to be from about 0.1 cm to about 10 cm; and wherein said tension is chosen to avoid undesirable weakening of said non-polarization-maintaining fiber.

2. The method of claim 1, wherein said tension produces an axial strain of about 0.1% to about 5%.

3. The method of claim 1, wherein a diameter of said non-polarization-maintaining optical fiber is from about 50 $\mu$m to about 1000 $\mu$m.

4. The method of claim 1, wherein said non-polarization-maintaining optical fiber is coiled to a minimum diameter such that a ray of light remains confined within a core.

5. The method of claim 1, wherein said non-polarization-maintaining optical fiber is a double clad fiber and the diameter of the fiber ranges from about 50 $\mu$m to about 1000 $\mu$m.

6. The method of claim 1, wherein said non-polarization-maintaining optical fiber is a single mode fiber.

7. The method of claim 5, wherein said non-polarization-maintaining optical fiber is a single mode fiber.

8. The method of claim 1, wherein said non-polarization-maintaining optical fiber is a multi-mode fiber.

9. The method of claim 5, wherein said non-polarization-maintaining optical fiber is a multi-mode fiber.

10. The product of claim 1.

11. The product of claim 7.

12. The product of claim 9.

13. An optical amplifier with a rare-earth-doped polarization-maintaining optical fiber, the amplifier comprising:

a mandrel having a selected diameter;

a rare-earth-doped polarization-maintaining optical fiber having one or more cladding layers and having linear birefringence greater than a random birefringence; and a pump source which is coupled to said optical fiber;

wherein said rare-earth-doped polarization-maintaining optical fiber is coiled around said mandrel under tension;

wherein said rare-earth-doped polarization-maintaining optical fiber is secured around said mandrel to thereby maintain said tension;

wherein said mandrel diameter is chosen to avoid significant bend loss;

wherein said rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$;

wherein said mandrel diameter is selected to be from about 0.1 cm to about 10 cm; and wherein said tension is chosen to avoid undesirable weakening of said polarization-maintaining fiber.

14. The optical amplifier as claimed in claim 13, wherein an upper limit of a tension-induced strain of said optical fiber is about 5%.

15. An optical amplifier as claimed in claim 13, wherein a diameter of said optical fiber is from about 50 µm to about 1000 µm.

16. The optical amplifier as claimed in claim 13, wherein said optical fiber is coiled to a minimum diameter such that a ray of light remains confined within a core.

17. The optical amplifier as claimed in claim 13, wherein the optical fiber is a double clad fiber and the diameter of the fiber ranges from about 50 µm to about 1000 µm.

18. The optical amplifier as claimed in claim 13, wherein said optical fiber is a single-mode fiber.

19. The optical amplifier as claimed in claim 13, wherein said optical fiber is a multi-mode fiber.

20. A method of forming a linear polarization-maintaining optical fiber amplifier, the method comprising the steps of:

providing a rare-earth-doped non-polarization-maintaining optical fiber having one or more cladding layers and having a random birefringence;

providing a mandrel having a selected diameter;

coiling said non-polarization-maintaining optical fiber under a selected tension around said mandrel to induce a linear birefringence greater than said random birefringence in said non-polarization-maintaining optical fiber thereby forming a polarization-maintaining optical fiber;

securing said polarization-maintaining optical fiber to said mandrel to thereby maintain said tension; and coupling a pump source to polarization-maintaining optical fiber;

wherein said mandrel diameter is chosen to avoid significant bend loss;

wherein said rare-earth dopant is selected from the group consisting $Nd^{3+}$, $Yb^{3+}$, $Pr^{3+}$, $Er^{3+}$, $Sm^{3+}$, $Ho^{3+}$ and $Tm^{3+}$;

wherein said mandrel diameter is selected to be from about 0.1 cm to about 10 cm; and wherein said tension is chosen to avoid undesirable weakening of said non-polarization maintaining fiber.

21. The product of claim 20.

22. A method of forming a linear polarization-maintaining optical fiber for use in an amplifier, the method comprising the steps of:

providing a rare-earth-doped non-polarization-maintaining optical fiber having one or more cladding layers, a diameter, a high NA and a random birefringence;

providing a mandrel having a selected diameter;

coiling said non-polarization-maintaining optical fiber around said mandrel to induce a linear birefringence greater than said random birefringence in said non-polarization-maintaining optical fiber thereby forming a polarization-maintaining optical fiber; and securing said polarization-maintaining optical fiber to said mandrel to thereby maintain said tension; and wherein said mandrel diameter is chosen to avoid significant bend loss;

wherein said rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$;

wherein said mandrel diameter is selected to be from about 0.1 cm to about 10 cm; and wherein said diameter of said non-polarization-maintaining optical fiber is from about 50 µm to about 1000 µm.

23. The product of claim 22.

24. An optical amplifier with a rare-earth-doped polarization-maintaining optical fiber, the amplifier comprising:

a mandrel having a selected diameter;

a rare-earth-doped polarization-maintaining optical fiber having one or more cladding layers, a high NA, and having linear birefringence greater than a random birefringence; and a pump signal source which is coupled to said optical fiber;

wherein said rare-earth-doped polarization-maintaining optical fiber is coiled around said mandrel;

wherein said rare-earth-doped polarization-maintaining optical fiber is secured around said mandrel to thereby maintain said tension;

wherein said mandrel diameter is chosen to avoid significant bend loss;

wherein said rare-earth dopant is selected from the group consisting $Nd^{3+}$, $Yb^{3+}$, $Pr^{3+}$, $Ho^{3+}$, $Er^{3+}$, $Sm^{3+}$ and $Tm^{3+}$;

wherein said mandrel diameter is selected to be from about 0.1 cm to about 10 cm; and wherein said diameter of said polarization-maintaining optical fiber is from about 50 µm to about 1000 µm.

25. A method of forming a linear polarization-maintaining optical amplifier for use in an amplifier, the method comprising the steps of:

providing a rare-earth-doped non-polarization-maintaining optical fiber having one or more cladding layers, a diameter, a high NA and a random birefringence;

providing a mandrel having a selected diameter;

coiling said non-polarization-maintaining optical fiber around said mandrel to induce a linear birefringence greater than said random birefringence in said non-polarization-maintaining optical fiber thereby forming a polarization-maintaining optical fiber; and securing said polarization-maintaining optical fiber to said mandrel to thereby maintain said tension; and coupling a pump source to polarization-maintaining optical fiber;

wherein said mandrel diameter is chosen to avoid significant bend loss;

wherein said rare-earth dopant is selected from the group consisting $Nd^{3+}$, $Yb^{3+}$, $Pr^{3+}$, $Er^{3+}$, $Sm^{3+}$, $Ho^{3+}$ and $Tm^{3+}$;

wherein said mandrel diameter is selected to be from about 0.1 cm to about 10 cm; and wherein said non-polarization-maintaining optical fiber diameter is from about 50 µm to about 1000 µm.

26. The product of claim 25.

* * * * *